United States Patent
Campbell

(10) Patent No.: US 6,336,995 B1
(45) Date of Patent: Jan. 8, 2002

(54) CROSS LINKED POLYAMIDE-EPHALOHYDRIN CREPING ADDITIVES

(75) Inventor: Clayton J. Campbell, Downingtown, PA (US)

(73) Assignee: Vulcan Materials, Inc., Downington, PA (US)

( * ) Notice: Subject to any disclaimer, the term of this patent is extended or adjusted under 35 U.S.C. 154(b) by 0 days.

(21) Appl. No.: 09/625,971

(22) Filed: Jul. 26, 2000

(51) Int. Cl.⁷ .............................. D21H 25/00; B31F 1/12
(52) U.S. Cl. ................... 162/111; 162/164.3; 264/282; 528/485; 528/488
(58) Field of Search ................... 162/111, 164.3; 264/282; 528/485, 488

(56) References Cited

U.S. PATENT DOCUMENTS

| | | | |
|---|---|---|---|
| 2,926,116 A | 2/1960 | Keim | 162/164 |
| 3,772,076 A | 11/1973 | Keim | 117/155 |
| 4,501,640 A | 2/1985 | Soerens | 162/111 |
| 5,246,544 A | 9/1993 | Hollenberg et al. | |
| 5,370,773 A | 12/1994 | Luu et al. | 162/111 |
| 5,374,334 A | 12/1994 | Sommese et al. | |
| 5,382,323 A | 1/1995 | Furman, Jr. | |
| 5,635,279 A | 6/1997 | Ma et al. | |
| 5,944,954 A | 8/1999 | Vinson et al. | 162/111 |
| 5,961,782 A | 10/1999 | Luu et al. | |
| 5,981,645 A | 11/1999 | Hollenberg et al. | |
| 5,994,449 A | 11/1999 | Maslanka | |

*Primary Examiner*—Peter Chin
(74) *Attorney, Agent, or Firm*—Blank Rome Comisky & McCauley LLP

(57) ABSTRACT

An adhesive for applying to a creping surface in the process of dry creping tissue paper is disclosed. The adhesive comprises a water-soluble, thermosetting, polyamide-epihalohydrin resin complexed with a metal ion. The adhesive provides controllable adhesion, rewetability, fugitive wet strength and doctorability for dry creping.

9 Claims, 1 Drawing Sheet

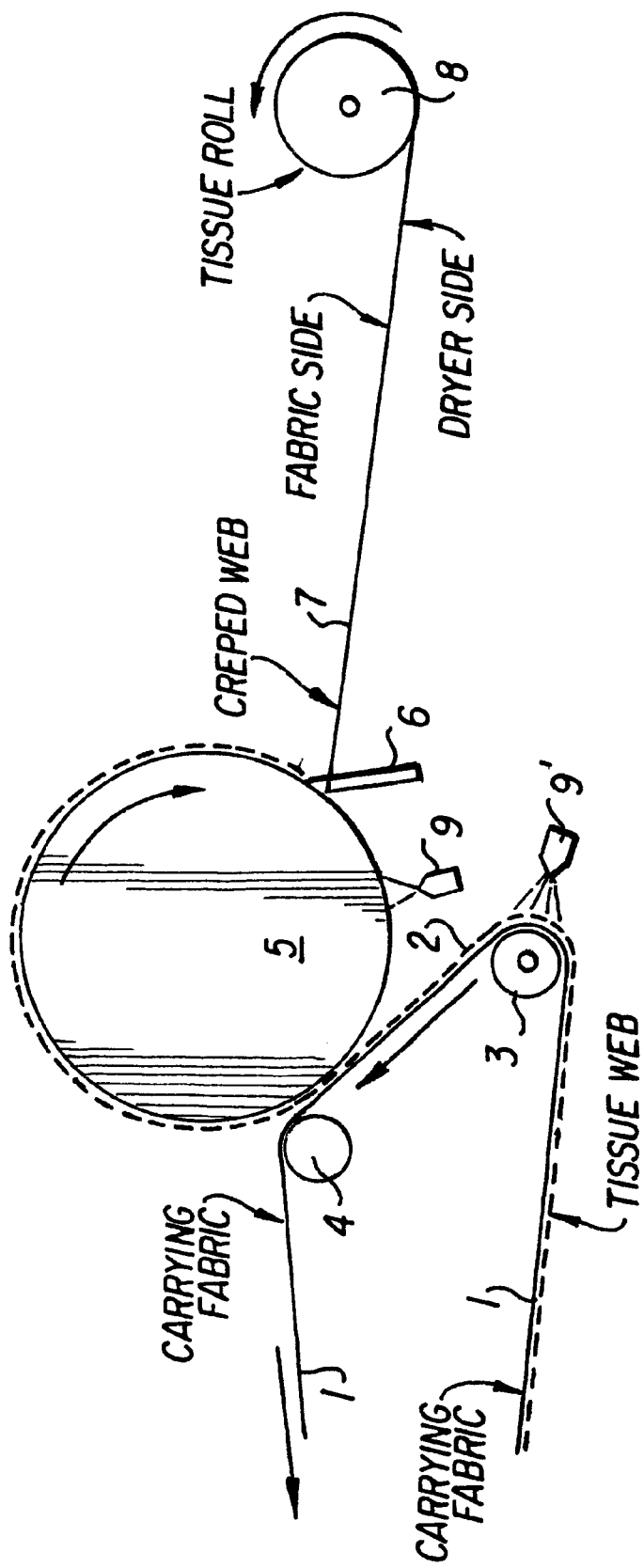

CROSS LINKED POLYAMIDE-EPHALOHYDRIN CREPING ADDITIVES

TECHNICAL FIELD

This invention relates, in general, to creped tissue paper products and processes. More specifically, it relates to dry creped tissue papers wherein an embryonic paper web is formed on a fourdrinier or similar paper making apparatus, adhesively secured while semi-dry to a cylindrical drying drum whereupon the drying of the web is substantially completed, and creped from the drum by means of a flexible creping blade. The invention also relates to novel, water dispersable polyamide-epihalohydrin creping adhesives complexed with metal ions.

BACKGROUND OF THE INVENTION

Sanitary paper tissue products are widely used. Such items are commercially offered in formats tailored for a variety of uses such as facial tissues, toilet tissues and absorbent towels. The formats, i.e. basis weight, thickness, strength, sheet size, dispensing medium, etc. of these products often differ widely, but they are linked by the common process by which they originate, the so-called creped papermaking process.

Creping is a means of mechanically compacting paper in the machine direction. The result is an increase in basis weight (mass per unit area) as well as dramatic changes in many physical properties, particularly when measured in the machine direction. Creping is generally accomplished with a flexible blade, a so-called doctor blade, against a Yankee dryer in an on machine operation. This blade is also sometimes referred to as a creping blade or simply a creper.

A Yankee dryer is a large diameter, generally 8–20 foot drum which is designed to be pressurized with steam to provide a hot surface for completing the drying of papermaking webs at the end of the papermaking process. The paper web which is first formed on a formations forming carrier, such as a Fourdrinier wire, where it is freed of the copious water needed to disperse the fibrous slurry is usually transferred to a felt or fabric in a so-called press section where de-watering is continued either by mechanically compacting the paper or by some other de-watering method such as through-drying with hot air, before finally being transferred in the semi-dry condition to the surface of the Yankee for the drying to be completed.

The impact of the adhered web with the doctor blade is essential to impart to the paper web the properties which are sought by manufacturers. Of particular importance are softness, strength and bulk.

Softness is the tactile sensation perceived by the consumer as he/she holds a particular product, rubs it across his/her skin, or crumples it within his/her hand. This tactile sensation is provided by a combination of several physical properties. One of the most important physical properties related to softness is generally considered by those skilled in the art to be the stiffness of the paper web from which the product is made. Stiffness, in turn, is usually considered to be directly dependent on the strength of the web.

Strength is the ability of the product, and its constituent webs, to maintain physical integrity and to resist tearing, bursting, and shredding under use conditions.

Bulk, as used herein, refers to the inverse of the density of a tissue paper web. It is another important part of real and perceived performance of tissue paper webs. Enhancements in bulk generally add to the cloth like, absorbent perception. A portion of the bulk of a tissue paper web is imparted by creping.

The level of adhesion of the papermaking web to the dryer is also of vital importance as it relates to the control of the web in its travel in the space between the creping blade and the winder upon which a roll of the paper is being formed. In addition, different creped products require different levels of adhesion, tack and rewetability, for example a facial tissue web will require a different level of adhesion, tack and rewetability compared to a paper towel web. Webs which are insufficiently adhered tend to cause poor control of the sheet with consequent difficulties in forming a uniform reel of paper. A loose sheet between the creper and the reel will result in wrinkles, foldovers, or weaving of the edges of the sheet in the rolled-up paper. Poorly formed rolls not only affect the reliability of the papermaking operation, but also the subsequent operations of tissue and towel manufacture in which the rolls are converted into the tissue and towel products.

The level of adhesion of the papermaking web to the dryer is also of vital importance as it relates to the drying of the web. Higher levels of adhesion reduce the impedance of heat transfer and cause the web to dry faster, enabling more energy efficient, higher speed operation.

However, the level of adhesion is not the sole factor determining product quality and manufacturing reliability. For example, some adhesives have been found to form a bond between the web and the doctor blade at the point of creping such that the web does not dislodge properly so that portions of the web remain adhered to the dryer and travel past the edge of the blade. This causes a defect in the web and often causes the web to break.

Further, while some amount of build-up of the adhesive on the dryer is essential, excessive build-up or streaks can be formed with some types of adhesives. Streaks can cause differences in the profile of adhesion across the width of the dryer. This can result in humps or wrinkles in the finished roll of paper. A second doctor blade is often positioned after the creping blade in order to remove any excess creping adhesive and other residue left behind. This blade is referred to as a cleaning blade. Cleaning blades and creping blades must be changed at some frequency to prevent a streaky coating and loss of sheet control.

The term "doctorability" as used herein refers to the relative ease with which the web is dislodged from the dryer without producing defects or requiring frequent changes of blades to prevent excessive build-up.

One important characteristic of a creping adhesive is that it be rewetable. "Rewetability", as used herein, refers to the ability of the adhesive film remaining on the heated drying surface to be activated by the moisture contained in the semi-dry issue web when the web is brought into contact with the heated drying surface. A marked increase in tack is indicative of high rewetability. Rewetability is important because only a portion of the drying surface is normally covered with adhesive on a given rotation of the Yankee dryer.

The majority of the adhesion of the sheet to the dryer occurs by means of the creping adhesive deposited in previous passes.

There is a natural tendency of paper making web to adhere to the cylindrical dryer owing to the build-up of deposits of both organic and inorganic components from the paper web. These components (fines, fillers and papermaking chemical additives) can form deposits that can impact the creping process efficiency at the point of transfer of the web to the cylindrical drum. The needs for specific level and type of adhesion however has induced considerable activity among researchers in the field. Consequently, a wide variety of creping adhesives are known in the art. The use of animal glue, for example, has long been known.

To maintain a specific and constant level of adhesion to provide a creped product with the desired physical properties, it is sometimes necessary to add a release agent with the adhesive to control or adjust the level of adhesion on the Yankee dryer surface.

Soerens, in U.S. Pat. No. 4,501,640, incorporated herein by reference, discloses an adhesive which comprises an aqueous admixture of polyvinyl alcohol and a water-soluble, thermosetting, cationic polyamide-epichlorohydrin resin.

Hollenberg et al., in U.S. Pat. No. 5,246,544, incorporated herein by reference, discloses an adhesive which comprises a water soluble hydroxylated polymer or oligimer and a cross linking metal cation.

In another example, Vinson et al., in U.S. Pat. No. 5,944,954, incorporated herein by reference, discloses a water soluble creping adhesive comprising a cationic starch and optionally a polyvinyl alcohol and a water-soluble, thermosetting cationic polyamide-epichlorohydrin resin.

While a number of adhesives including these examples have been disclosed and are available, no single adhesive or adhesive blend has provided a satisfactory combination of doctorability, rewetability, and level of adhesion.

In addition, a serious problem with the water-soluble, thermosetting cationic polyamide-epichlorohydrin resins is that the physical properties of the resin such as doctorability, rewetability and the level of adhesion are in large measure controlled by the degree of cross-linking by the epichlorohydrin so that it is very difficult to vary these properties for a given creping machine. Paper makers have recognized that the different creping machines and different wood pulps have different properties with the contemporaneous need for changing the properties of the creping adhesive to optimize the creping process. Paper makers have long wanted the ability to control and change the amount of cross-linking to achieve the precise amount of doctorability, rewetability and adhesion level desired for a given papermaking line to optimize the creping process. With the water-soluble, thermosetting cationic polyamide-epichlorohydrin resins of the prior art that degree of control has not been possible because the cross-linking of the adhesive occurs during the manufacturing process and it is impractical to have a number of water-soluble, thermosetting cationic polyamide-epichlorohydrin resins with different degrees of cross-linking in an attempt to tailor the creping adhesive to the creping process.

Therefore, it is an object of the present invention to provide an adhesive for creping tissue paper and a process for applying it which overcome these limitations by offering a creping adhesive that can be readily varied in a controlled manner so that the doctorability, rewetability and adhesion level desired for a given papermaking line can be optimized for a given creping process.

It is another object of the invention to provide a adhesive whose properties may be readily varied and adjusted by varying the percentage of the metal ion in the adhesive composition.

It is a further object of the invention to provide an improved creping process for the production of a creped paper product.

These and other objects are obtained using the present invention as will be taught in the following disclosure.

SUMMARY OF THE INVENTION

The invention is an aqueous dispersion useful as a creping adhesive comprising a water-dispersable thermally cross-linked polyamide-epihalohydrin resin with at least one multivalent metal ion. The weight percentage of metal ion to weight percentage of polyamide-epihalohydrin can vary from 0.05 to 12.0 weight percent, preferably 0.50 to 10.0 weight percent and even more preferably 0.75 to 8.0 weight percent.

The dispersion contains from about 90% to 99.9% water and more preferably, from about 95 to 99.9% water.

The polyamide-epihalohydrin resins preferably comprises the reaction product of an epihalohydrin and a polyamide containing secondary or tertiary amine groups. The epihalohydrin is preferably epichlorohydrin and the polyamide amine groups are preferably secondary amine groups derived from a polyalkylene polyamide and a saturated aliphatic dibasic carboxylic acid. The dibasic carboxylic acid preferably contains from about 3 to about 10 carbon atoms.

The mole ratio of epihalohydrin to secondary amine groups in the polyamide is preferably about 0.5 to 1 to about 2 to 1.

The multivalent metal ion is selected from calcium, strontium, barium, titanium, chromium, manganese, iron, cobalt, nickel, zinc, molybdenum, tin, antimony, niobium, vanadium, tungsten, hafnium and zirconium. Mixtures of metals ions can also be used. Preferred anions include acetate, formate, hydroxide, oxo, carbonate, chloride, bromide, and iodide.

In a preferred formulation the polyamide-epihalohydrin is cross-linked with the epihalohydrin to a given degree of cross-linking. A given metal ion or combination of metal ions is then selected and the metal ion is then added to coordinate with ligands located on the epihalohydrin-polyamide resin. The metal ion selected and the concentration of metal ion can be adjusted to vary the properties of the resin such as insolubility, rewetability, density, cross-linking, brittleness and to reduce or increase the tack or adhesion properties of the mixture. In this manner the properties of the creping adhesive can be readily adjusted so that the creping adhesive is optimized for a given drier and wood pulp composition. In general, for a constant degree of cross-linking by the epihalohydrin, as the concentration of metal ion increases the insolubility, rewetability, density, and brittleness increase and the degree of adhesion and tack decreases.

The invention further provides a process for creping tissue paper. The process comprises:

a. applying to a rotating creping cylinder an aqueous dispersion comprising from about 90% to about 99.9% water and from about 10% to about 0.1% solids, wherein said solids comprise a water dispersable, polyamide epihalohydrin and a multivalent metal ion;

b. pressing a tissue paper web against the creping cylinder to effect adhesion of the web to the surface of the cylinder; and c. dislodging the web from the creping cylinder by contact with a doctor blade.

The total amount of applied creping adhesive is preferably from about 0.1 lb/ton to about 10 lb/ton based on the dry weight of the creping adhesive and the dry weight of the paper web. The unit lb/ton, as used herein, refers to the dry amount of creping adhesive measured in lbs. relative to the dry amount of paper measured in tons.

The tissue web can be comprised of various types of natural and recycled fibers including wood pulps of chemical and mechanical types. The fibers can comprise hardwood, softwood and cotton fibers. The tissue web can also contain particulate fillers, fines, ash, organic contaminates such as the cellophane from envelope windows, adhesives such as PVA-styrene-butadiene and release adhesives from Post-It notes and inks as well as process chemicals used in the paper-making process such as strength additives, softeners, surfactants and organic polymers.

In its preferred embodiment, the method is used to prepare tissue paper with a basis weight between about 10 g/m$^2$ and about 50 g/m$^2$ and, more preferably, between about 10 g/m$^2$ and about 30 g/m$^2$. The preferred density is between about 0.03 g/m$^3$ and about 0.6 g/cm$^3$, and more preferably, between about 0.05 g/cm$^3$ and 0.2 g/cm$^3$.

All percentages, ratios and proportions herein are by weight unless otherwise specified.

BRIEF DESCRIPTION OF THE DRAWING

FIG. 1 is a schematic representation of the papermaking process incorporating the preferred embodiment of the present invention comprising the novel adhesive for dry creping tissue paper.

DETAILED DESCRIPTION OF THE PREFERRED EMBODIMENTS

The detailed description of the invention is provided as an aid to understanding of the invention; but is not intended to limit the invention, which is defined by the claims which particularly point out and distinctly claim the subject matter regarded as the invention.

As used herein, the term "comprising" means that the various components, ingredients, or steps, can be conjointly employed in practicing the present invention. Accordingly, the term "comprising encompasses the more restrictive terms "consisting essentially of" and "consisting of".

As used herein, the term "water soluble" refers to materials that are soluble in water to at least 3%, by weight, at 25° C.

As used herein, the terms "tissue paper web, paper web, web, paper sheet and paper product" all refer to sheets of paper made by a process comprising the steps of forming an aqueous papermaking furnish, depositing this furnish on a foraminous surface, such as a Fourdrinier wire, and removing the water from the furnish as by gravity or vacuum-assisted drainage, with or without pressing, and by evaporation, comprising the final steps of adhering the sheet in a semi-dry condition to the surface of a Yankee dryer, completing the water removal by evaporation to an essentially dry state, removal of the web from the Yankee dryer by means of a flexible creping blade, and winding the resultant sheet onto a reel.

The terms "multi-layered tissue paper web, multi-layered paper web, multi-layered web, multi-layered paper sheet and multi-layered paper product" are all used interchangeably in the art to refer to sheets of paper prepared from two or more layers of aqueous paper making furnish which are preferably comprised of different fiber types, the fibers typically being relatively long softwood and relatively short hardwood fibers as used in tissue paper making. The layers are preferably formed from the deposition of separate streams of dilute fiber slurries upon one or more endless foraminous surfaces. If the individual layers are initially formed on separate foraminous surfaces, the layers can be subsequently combined when wet to form a multi-layered tissue paper web.

As used herein, the term "single-ply tissue product" means that it is comprised of one ply of creped tissue; the ply can be substantially homogenous in nature or it can be a multi-layered tissue paper web. As used herein, the term "multi-ply tissue product" means that it is comprised of more than one ply of creped tissue. The plies of a multi-ply tissue product can be substantially homogenous in nature of they can be multi-layered tissue paper webs.

In its most general form, the invention is an aqueous dispersion useful as a creping adhesive comprising a polyamide-epihalohydrin cross-linked with a multivalent metal ion. The multivalent metal ion has at least a valence of 2 and preferably a valence of 3 or more. The multivalent metal ion should also have a coordination number of at least two and preferably a coordination number of four or greater.

As used herein, the term "aqueous dispersion" refers to compositions consisting predominantly of water and containing at least one additional component homogeneously distributed throughout the composition. The essential element is the homogeneity of the composition. It is not necessary that all components be dissolved at the molecular level. Thus, the term "aqueous dispersions" encompasses the more restrictive term "aqueous solution".

The water-soluble, thermosetting, cationic polyamide-epihalohydrin resin comprises the reaction product of an epihalohydrin and a polyamide containing secondary amine groups or tertiary amine groups.

Commercial suppliers of polyamide-epihalohydrin resins include Hercules Inc. of Wilmington, Del., Vulcan Chemicals of Birmingham, Ala. and Georgia-Pacific Corp. of Atlanta, Ga. These resins are supplied as a concentrated solution in water and need only be diluted in order to be easily sprayed for application to a Yankee dryer or to a semi-dry tissue web.

The basic chemistry of preparation of the water soluble, thermosetting, cationic polyamide-epihalohydrin resin is described by Keim in U.S. Pat. Nos. 2,926,116; 3,058,873 and 3,772,076, all of which are incorporated herein by reference.

Preferably, the polyamide-epichlorohydrin resin comprises a water-soluble polymeric reaction product of epichlorohydrin, and a water-soluble polyamide having secondary amine groups.

In the preparation of one particularly preferred resin, a dibasic carboxylic acid is first reacted with the polyalkylene polyamine, preferably in aqueous solution, under conditions suitable to produce a water soluble polyamide with the repeating units

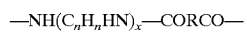
—NH(C$_n$H$_n$HN)$_x$—CORCO— where n and x are each 2 or more and R is the divalent hydrocarbon radical of the dibasic carboxylic acid containing from about 3–10 carbon atoms.

The preparation of the resin is then completed by reacting the water-soluble polyamide with an epihalohydrin, particularly epichlorohydrin, to form the water-soluble cationic polyamide-epihalohydrin thermosetting resin.

The polyamide secondary amine groups are preferably derived from a polyalkylene polyamine for example polyethylene polyamides, polypropylene polyamines or polybutylene polyamines and the like, with diethylenetriamine being preferred.

The dicarboxylic acid is one of the saturated aliphatic dibasic carboxylic acids containing from about 3 to about 10 carbon atoms such as succinic, adipic, azelaic, and the like, and mixtures thereof. Dicarboxylic acids containing from 4 to 8 carbon atoms are preferred, with adipic acid being most preferred.

Preferably the mole ratio of polyalkylene to dibasic carboxylic acid is from about 0.8 to 1 to about 1.5 to 1.

The mole ratio of epihalohydrin to secondary amine groups in the polyamide is preferably from about 0.5 to 1 to about 2 to 1.

The multivalent metal ion is selected from aluminum, calcium, strontium, barium, titanium, chromium, manganese, iron, cobalt, nickel, zinc, molybdenum, tin, antimony, niobium, vanadium, tungsten, hafnium and zirconium. Mixtures of metals ions can also be used. Preferred anions include acetate, formate, hydroxide, oxo, carbonate, sulfate chloride, bromide, and iodide.

In a preferred formulation the polyamide-epihalohydrin is cross-linked with the epihalohydrin to a given degree of cross-linking. A given metal ion or combination of metal ions is then selected and the metal ion is then added to coordinate with ligands sited on the epihalohydrin-polyamide resin. The metal ion and concentration of metal ion can be adjusted to vary the properties of the resin such as insolubility, rewetability, density, cross linking, brittleness and to reduce or increase the tack or adhesion properties of the mixture. In general for a given degree of cross linking as the concentration of metal ion increases the insolubility, rewetability, density, and brittleness increase and the degree of adhesion and tack decreases. The ability to control these physical properties allows the operator to precisely control the desired properties of the creping adhesive, in effect the operator can "dial in" the desired creping adhesive properties by varying the metal ion concentration.

The invention further provides a process for creping tissue paper. The process comprises:
  a. applying to a rotating creping cylinder an aqueous dispersion comprising from about 90% to about 99.9% water and from about 10% to about 0.1% which, wherein said solids comprise a water dispersable, polyamide epihalohydrin and a multivalent metal ion;
  b. pressing a tissue paper web against the creping cylinder to effect adhesion of the web to the surface of the cylinder; and
  c. dislodging the web from the creping cylinder by contact with a doctor blade.

The total amount of applied creping adhesive is preferably from about 0.1 lb/ton to about 10 lb/ton based on the dry weight of the creping adhesive and the dry weight of the paper web. The unit lb/ton, as used herein, refers to the dry amount of creping adhesive measured in lbs. relative to the dry amount of paper measured in tons.

The tissue web can be comprised of various types of natural and recycled fibers including wood pulps of chemical and mechanical types. The fibers can comprise hardwood, softwood and cotton fibers. The tissue web can also contain particulate fillers, fines, ash, organic contaminates such as the cellophane from envelope windows, adhesives such as PVA-styrene-butadiene and inks as well as process chemicals used in the paper-making process such as strength additives, softeners, surfactants and organic polymers.

The drawing FIGURE illustrates the conventional steps in formation of a tissue paper web. This conventional process includes the steps of preforming a fibrous web, applying a creping adhesive to the surface of a Yankee dryer, applying the fibrous web to the surface of the Yankee dryer having the creping adhesive on the external surface thereof, removing the fibrous web from the Yankee dryer by use of a creping blade and winding the dried fibrous web onto a roll. Alternatively, the creping adhesive can be applied to the surface of the fibrous web that will contact the dryer, before the fibrous web is presented to the dryer.

Referring to the drawing FIGURE, this represents one of a number of possible configurations used in processing tissue products. In this particular arrangement, the transfer and impression fabric designated at 1 carries the formed, dewatered web 2 around turning roll 3 to the nip between press roll 4 and Yankee dryer 5. The fabric, web and dryer move in the directions indicated by the arrows. The entry of the web to the dryer is well around the roll from creping blade 6 which, as schematically indicated, crepes the traveling web from the dryer as indicated at 7. The creped web 7 exiting from the dryer is wound into a soft creped tissue roll 8. To adhere the nascent web 2 to the surface of the dryer, a spray 9 of adhesive is applied to the surface ahead of the nip between the press roll 4 and Yankee 5. Alternately, the spray may be applied to the traveling web 2 directly as shown at 9'. Suitable apparatus for use with the present invention as disclosed in U.S. Pat. Nos. 4,304,625 and 4,064,213, which are hereby incorporated by reference.

This illustration does not incorporate all the possible configurations used in presenting a nascent web to a Yankee dryer. It is used only to describe how the adhesive of the present invention can be used to promote adhesion and thereby influence the crepe of the product. The present invention can be used with all other known processes that rely upon creping the web from a dryer surface. In the same manner, the method of application of the adhesive to the surface of the dryer or the web is not restricted to spray applications, although these are generally the simplest method for adhesive application.

EXAMPLES

In the following examples, the adhesive is prepared by suspending the indicated polyamide-epichlorohydrin in water and then adding the zirconium acetate.

The film is prepared by determining the solids and then adjusted to a percentage that is kept constant throughout the testing. The solids were determined by casting thirty grams of adhesive with a 12 to 15% solids content into a casting plate. The plate is then placed in a forced air oven at 100° F. for 16 hours to remove most of the water and air bubbles. The temperature is then raised to 250° F. for 30 minutes to cure and fully dehydrate the film. The plates were allowed to cool and then the films were removed from the plates The film insolubility was determined as follows:
  A one inch by one inch square of film was weighed and then placed in a 250 ml. beaker containing 100 ml. of tap water at room temperature and a two inch long magnetic stir bar. The beaker is placed on a magnetic stirrer and the stirrer speed is adjusted so that the vortex is just touching the stir bar. The sample was mixed for five minutes and then as much liquid as possible is decanted. The remaining liquid and undissolved film is quantitatively transferred to a tared weighing dish and oven dried at 105 C. for two hours before being allowed to cool and weighed.

The film rewet was determined as follows:
  A preweighed sample of dried film, about 1"×1", was placed on a 2"×2" fine mesh screen and immersed in a container containing 50 ml. of room temperature water for 5, 10 and 20 minutes. The screen is removed and the excess water is blotted from underneath. The wet sample is then weighed.

The film adhesion was determined as follows:
  After the film drying process, the plates were allowed to cool for one hour the films were then removed from the drying plates.

A two and one half inch diameter round sample of dried film was placed between two four and one half inch square metal plates. The bottom plate was secured and stationary and the top plate had a handle on one side. The film was placed in the middle of the bottom stationary plate with the dried film top surface facing down. Ten pounds of force was uniformly exerted for two minutes to the top plate. An Extech tension force gauge pulled the top plate off the bottom plate at a 90° angle allowing the film to be uniformly peeled off of the plate. The peak force (grams) required to separate the two plates is recorded.

| Polyamide-epichlorohydrin | Insolubility* | Rewet-water uptake (grams H2O/gram Adhesive)** | | | Peel (grams) |
|---|---|---|---|---|---|
| | | 5 min. | 10 min. | 15 min. | |
| Omnicrepe A1 control sample[1] | 25.0% | Film dissolves | | | 3,760 |
| Omnicrepe A1 + 1.6% ZrAc | 42.9% | 1.4 | 1.65 | 2.0 | 2,555 |
| Omnicrepe A1 + 3.3% ZrAc | 85.7% | 0.93 | 0.93 | 1.71 | 1,496 |
| Omnicrepe A1 + 4.9% ZrAc | 84.6% | 0.4 | 1.31 | 2.27 | 965 |
| Omnicrepe A1 + 6.6% ZrAc | 100% | 0.69 | 1.91 | 2.4 | 869 |
| Omnicrepe A1 + 8.2% ZrAc | 100% | 0.7% | 2.17 | 2.25 | — |
| Omnicrepe A2 typical sample[1] | 95.7[2] | 1.9[2] | 2.7[2] | 1.2[2] | 2,391[2] |
| Omnicrepe A2 + 3.3% ZrAc | 95.2[2] | 1.9[2] | 2.7[2] | 4.3[2] | 270[2] |
| Calgon ECC DP | 94.4 | 0.6 | 1.14 | 1.09 | 412 |
| Hercules 805 | 40.0% | Film dissolves | | | 5,500 |
| Hercules 803 | 83.3% | 1.0 | 1.33 | 2.33 | 270 |

*% insolubility equals the weight of the undissolved film (as measured by the insolubility test above) divided by the initial film weight multiplied by 100.
**Rewetting or water uptake is defined by (gm. water/gm. adhesive) = (wt. wet film − wt. dry film)/wt. dry film
1. Omnicrepe A1 has the same chemical formulation as Omnicrepe A2, but Omnicrepe A1 has a lesser degree of crosslinking by epichlorohydrin than Omnicrepe A2. Omnicrepe A2 has typical properties of a polyamide-epichlorohydrin creping adhesive.
2. When the sample insolubility and rewetability is already high, the addition of ZrAc will not necessarily change these values, however, as seen from the adhesion data the tack is significantly changed.

I claim:

1. A method for the manufacture of tissue paper comprising,
   a. applying to a rotating creping cylinder an aqueous dispersion comprising from about 90% to about 99.9% water and from about 10% to about 0.1% which, wherein said solids comprise a water dispersable, cross-linked polyamide epihalohydrin completed with a multivalent metal ion;
   b. pressing a tissue paper web against the creping cylinder to effect adhesion of the web to the surface of the cylinder; and
   c. dislodging the web from the creping cylinder by contact with a doctor blade.

2. The method of claim 1 wherein the polyamide-epihalohydrin comprises a water soluble polyamide with the repeating units

—NH($C_nH_n$HN)$_x$—CORCO— where n and x are each 2 or more and R is the divalent hydrocarbon radical of the dibasic carboxylic acid containing from about 3–10 carbon atoms.

3. The method of claim 2 wherein the dibasic dicarboxcylic acid is selected from the group consisting of succinic acid, adipic acid, azelaic acid and mixtures thereof.

4. The method of claim 1 wherein the metal ion is selected from the group consisting of aluminum, calcium, strontium, barium, titanium, chromium, manganese, iron, cobalt, nickel, zinc, molybdenum, tin, antimony, niobium, vanadium, tungsten, hafnium and zirconium and mixtures thereof.

5. The method of claim 4 wherein the metal ion is zirconium.

6. A creping adhesive comprising a water-dispersable cross-linked polyamide epihalohydrin adhesive complexed with at least one multivalent metal ion said polyamide comprising a water soluble polyamide with the repeating units

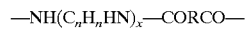
—NH($C_nH_n$HN)$_x$—CORCO— where n and x are each 2 or more and R is the divalent hydrocarbon radical of the dibasic carboxylic acid containing from about 3–10 carbon atoms.

7. The creping adhesive of claim 6 wherein said metal ions are selected from the group consisting of aluminum, calcium, strontium, barium, titanium, chromium, manganese, iron, cobalt, nickel, zinc, molybdenum, tin, antimony, niobium, vanadium, tungsten, hafnium zirconium and mixtures thereof.

8. The creping adhesive of claim 7 wherein said metal ion is zirconium.

9. The creping adhesive of claim 6 wherein the dibasic dicarboxylic acid is selected from the group consisting of succinic acid, adipic acid, azelaic acid and mixtures thereof.

* * * * *